May 18, 1937.  J. D. BECHTEL  2,080,455
POWER TRANSMITTING DEVICE AND METHOD OF MAKING SAME
Filed Aug. 8, 1934  2 Sheets-Sheet 1

INVENTOR.
John D. Bechtel.
BY
George V. Woodling
ATTORNEY.

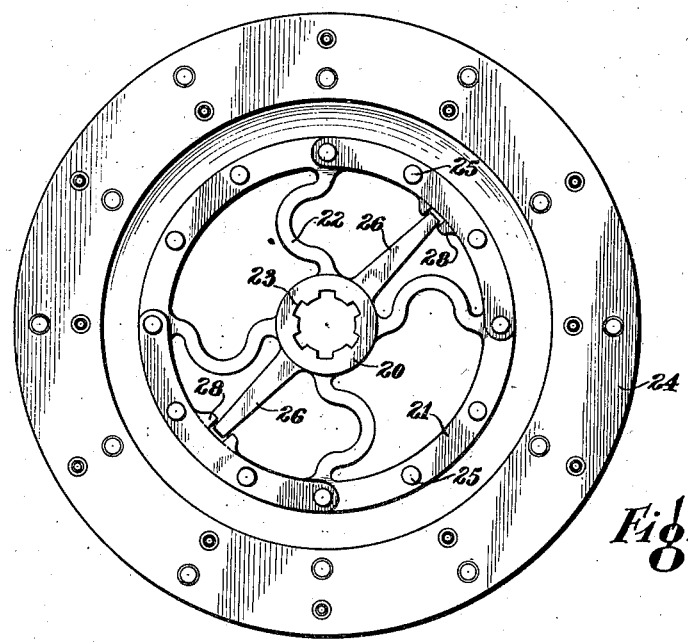
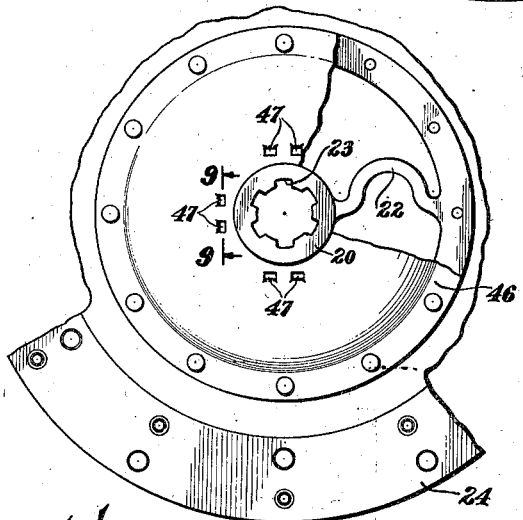
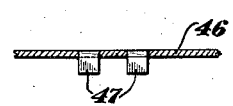
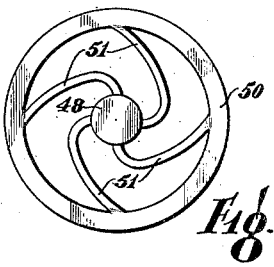
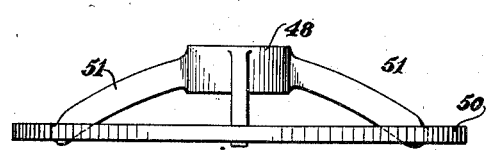

Patented May 18, 1937

2,080,455

UNITED STATES PATENT OFFICE 2,080,455

POWER TRANSMITTING DEVICE AND METHOD OF MAKING SAME

John D. Bechtel, East Cleveland, Ohio

Application August 8, 1934, Serial No. 738,997

7 Claims. (Cl. 29—159)

My invention relates generally to power transmitting devices, and more particularly to flexible center clutch plates for automobiles, trucks and the like.

An object of my invention is the provision of constructing a flexible power transmitting device of one integral piece in such manner that the grain flow of the interconnecting members between the hub and the rim runs substantially longitudinally of the said interconnecting members to give a good resilient action.

Another object of my invention is the provision of a flexible power transmitting device which, when placed between the driving and the driven shafts, gives a smooth transmission of power between said shafts.

A still further object of my invention is to provide for limiting the angular displacement afforded by the resilient driving members between the hub and the rim of the flexible power transmitting device.

Another object of my invention is to provide for constructing a flexible power transmitting device having a hub and a rim by upsetting a piece of metal in such manner that the grain flow of the upset piece of metal runs substantially radially; forging the hub and the rim from the upset piece of metal at the same time preserving substantially the character of the grain flow in the interconnecting resilient driving members between the hub and the rim to insure good resiliency, and finally forming the interconnecting resilient members in an arcuate manner to increase their resiliency.

Other objects and a fuller understanding of my invention may be had by referring to the following description taken in conjunction with the accompanying drawings, in which:

Figure 7 illustrates a plan view of an entire assembly of a clutch plate, the center portion embodying features of my invention;

Figure 8 is a fragmentary and modified view of my invention showing a cover plate having stops for limiting the relative angular movement between the hub and the rim;

Figure 9 is a fragmentary and cross-sectional view of a cover plate taken along the line 9—9 of Figure 8;

Figure 10 is a modified form of my invention shown in side-elevation in that during the construction the hub and the rim are formed in a cupped shape manner, and Figure 11 is a plan view of the modified form of my invention shown in Figure 10 wherein the hub is twisted a quarter of a turn with respect to the rim.

Figure 1:
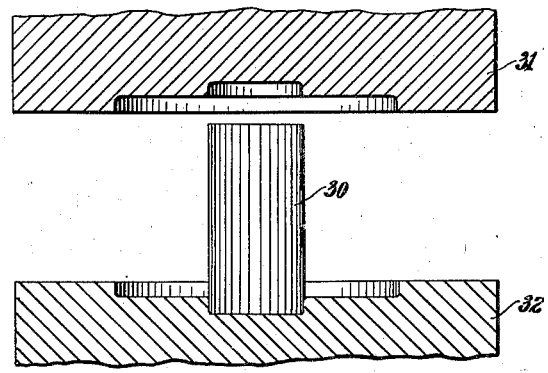
Figure 1 represents a piece of metal arranged to be formed by forging dies.

With reference to Figure 7 of the drawings, my power transmitting device is illustrated in the form of a flexible center clutch plate, but it is to be understood that my invention is not limited to flexible center clutch plates but may be used for transmitting power between a driving and a driven shaft for any application.

In the entire clutch assembly as shown in Figure 7 the reference character 20 represents the hub, the reference character 21 the rim, the reference character 22 the interconnecting driving members between the hub and the rim, and the reference character 24 the frictional engaging driving surface of the clutch. In the construction of my center clutch plate the interconnecting driving members 22 are resilient and afford angular relative movement between the hub 20 and the rim 21. This insures an even and smooth transmission of power between the driving and the driven shaft. In order to limit the angular relative movement between the hub 20 and rim 21 there is provided two stop arms 26, the ends of which project between two engaging lugs 28. As illustrated, there is clearance between the end of the stop arm 26 and the two engaging lugs 28. In actual practice this clearance is relatively small, but still large enough to absorb any sudden shock that is subjected to the flexible center clutch plate. The amount of clearance, however, depends in a large measure upon the particular application to which my flexible center driving clutch is utilized.

Figure 2:
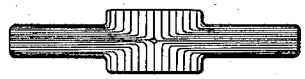
Figure 2 is a cross-sectional view of the piece of metal after the metal has been formed by the forging dies of Figure 1, the fine lines indicating the grain flow of the metal.

The manner in which my flexible center clutch plate is constructed may be described in the following manner. With reference to Figure 1, I illustrate a piece of steel 30 that is adapted to be forged by the forging dies 31 and 32. The fine vertical lines upon the piece of steel 30 illustrate the point that the grain flow of the piece of steel 30 is longitudinal of the metal. The forging dies 31 and 32 form the piece of metal into a disk-like shape which is illustrated in Figure 2. In Figure 2 the grain flow of the metal is illustrated by the fine lines which run radially from the hub portion to the outer rim portion.

Figure 3:
Figure 3 represents the form of the piece of metal after it is subjected to another set of dies not shown, being the form of the piece of metal just prior to stamping out certain sections to form the hub and the rim, a quarter-section having been cut away to illustrate more fully the cross-sectional shape of the said form.
Figure 4:
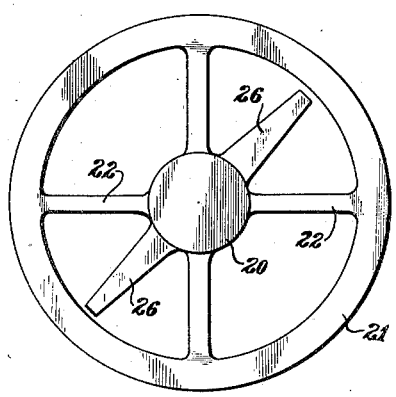
Figure 4 is a plan view of the piece of metal after certain sections have been cut away to form the hub and the rim and the interconnecting driving members.

The next operation of the disk-like form shown in Figure 2 is to again forge the piece of metal to take the form shown in Figure 3. In this form the outer edge is forged to present a relatively small rim 35. The reference character 36 represents the "flash" caused by the excess amount of steel. The next operation is to take the disk-like form shown in Figure 3 and stamp out certain portions and thereby form the hub 20 and the rim 21 together with the interconnecting driving members 22 and the stop arms 26. Also, during this operation the "flash" material 36 has been cut away.

Figure 5:
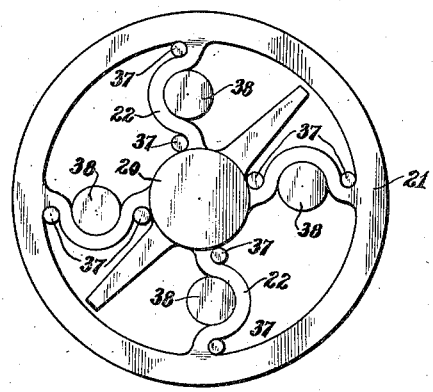
Figure 5 is a plan view similar to that of Figure 4, showing the manner in which the interconnecting members between the hub and the rim are formed in an arcuate manner to increase the resiliency of the interconnecting members.
Figure 6:
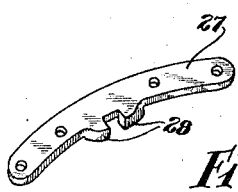
Figure 6 illustrates a prospective view of a stop member adapted to be riveted to the rim of the power transmitting device.

The next operation is shown in Figure 5 wherein the interconnecting driving members 22 are bent in an arcuate manner to increase their resiliency. This may be done by utilizing a stationary jig having round lugs 37 which fit next to the rim and to the hub, and a movable jig having lugs 38 which engage the interconnecting driving members 22 substantially midway between the hub 20 and the rim 21. After the stationary and movable jigs engage the interconnecting driving members the movable jig is turned relatively to the stationary jig, thereby elongating the interconnected driving members 22, at the same time bending them in an arcuate manner. It is noted that throughout all of the preceding operations that the character of the grain flow is preserved in that the grain flow is substantially longitudinal of the interconnecting driving member 22. This insures that the interconnecting driving members 22 are strong and durable, and at the same time resilient, to afford angular displacement between the rim 21 and the hub 20. It is noted further that the interconnecting driving members 22 are wider than the rim 21. This can be observed more clearly in Figure 3, the cross-sectional portion being representative of the depth of the interconnecting driving members 22. Therefore, the interconnecting driving members 22 may be relatively thin to give good resiliency but at the same time relatively strong to transmit a large amount of power since they are relatively wide.

In constructing the complete clutch assembly the hub 20 is splined such as at 23, and the frictional engaging driving surface 24 is riveted to the rim 21 by means of the rivets 25. Also, during the riveting operation the stop member 27 is likewise riveted to the rim 21. Therefore, it is observed that my flexible center clutch plate is relatively simple in construction and at the same time affording a great dependability with a high degree of resiliency.

In Figure 8 I illustrate a modified form of my invention in that the angular relative movement between the hub 20 and the rim 21 is limited by means of a cover plate 46 having spaced lugs 47 which are adapted to engage opposite sides of the interconnecting members 22 at a point relatively close to the hub 20. A cross-sectional view of the cover plate and the spaced lugs is shown in Figure 9. There is a clearance between the spaced lugs 47 and the interconnecting driving member 22 which allows a limited amount of relative movement between the hub 20 and the rim 21.

In Figure 10 I show a modified arrangement of constructing my flexible center clutch plate in that the rim 50, the hub 48 and the interconnecting driving members 51 are forged from a cupped shaped piece of steel. The forging operations are substantially the same as that previously described with the preferred form of my invention. To complete the modified flexible center driving clutch plate as shown in Figure 10, the hub 48 is twisted relative to the rim 50 while at the same time the hub 48 and the rim 50 are aligned in substantially the same driving plane.

This is shown in Figure 11 wherein the hub 48 is turned substantially a quarter turn with respect to the rim 50, and the hub 48 lies in the same place as the plane of the rim 50. In this embodiment of my invention the interconnecting driving members 51 give a good spring action because the grain flow of the metal is substantially longitudinal of the interconnecting driving members 51.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. The process of constructing a power transmitting device having a hub, a rim, and interconnecting resilient driving members which comprises, upsetting from one integral piece having a diameter substantially the same as the hub of said device to form the hub, the rim, and the interconnecting resilient driving members in such manner that the grain flow of the interconnecting resilient members runs radially from said hub and substantially longitudinally of the said driving members to give a good resilient action.

2. The process of constructing a power transmitting device having a hub, a rim, and interconnecting resilient driving members which comprises, upsetting from one integral piece having a diameter substantially the same as the hub of said device to form the hub, the rim, and the interconnecting resilient driving members in such manner that the grain flow of the interconnecting resilient members runs radially from said hub and substantially longitudinally of the said driving members to give a good resilient action, and forming the interconnecting resilient members in an arcuate manner to increase their resiliency.

3. The process of constructing a power transmitting device having a hub, a rim, and interconnecting resilient driving members which comprises, upsetting a piece of metal having a diameter substantially the same as said hub in such manner that the grain flow of the upset piece of metal runs substantially radially from said hub, forging the hub, the rim, and the interconnecting resilient driving members from the upset piece of metal, at the same time preserving substantially the character of the grain flow in the interconnecting resilient driving members to insure good resiliency and forming the interconnecting resilient members in an arcuate manner to increase their resiliency.

4. The process of constructing a power transmitting device having a hub, a rim, and interconnecting resilient driving members which comprises, upsetting a piece of metal in such manner that the grain flow of the upset piece of metal runs substantially radially, forming the upset piece of metal in a cup-shaped manner, thus making the center portion from which the hub is to be formed be in a different plane than the outer portion from which the rim is to be formed, forging the hub, the rim, and the resilient interconnecting driving members from the cup-shaped piece of metal, at the same time preserving substantially the character of the grain flow in the interconnecting resilient driving members to insure good resiliency, and aligning the central hub portion and the outer rim portion in substantially the same driving plane, at the same time causing relative angular displacement between the central hub portion and the outer rim portion.

5. A power transmitting device comprising, in combination, a hub and a rim between which power is transmitted, and resilient driving members interconnecting the hub and the rim to transmit said power, the said device being constructed of one integral piece and in such manner that the grain flow of the resilient driving members runs radially from said hub and substantially longitudinally of the said driving members to give a good resilient action.

6. A power transmitting device comprising, in combination, a hub and a rim between which power is transmitted, and resilient driving members interconnecting the hub and the rim to transmit said power, the said device being constructed of one integral piece and in such manner that the grain flow of the resilient driving members runs radially from said hub and substantially longitudinally of the said driving members to give a good resilient action, and means for limiting the angular displacement afforded by the resilient driving members between the hub and the rim.

7. A power transmitting device comprising, in combination, a hub and a rim between which power is transmitted, and resilient driving members interconnecting the hub and the rim to transmit said power, the said device being constructed of one integral piece and in such manner that the grain flow of the resilient driving members runs radially from said hub and substantially longitudinally of the said driving members to give a good resilient action, and means for limiting the angular displacement afforded by the resilient driving members between the hub and the rim, said limiting means including a portion connected to the hub and a second portion connected to the rim and disposed in relatively close space relation to the portion that is connected to the hub.

JOHN D. BECHTEL.